Jan. 7, 1941.  M. R. WILLIAMS ET AL  2,227,476
METHOD OF STRAIGHTENING WELDED STRUCTURES
Filed Nov. 8, 1938

INVENTORS
MILO R. WILLIAMS, AND, A.L. DUNNING
BY
*Ransom K. Davis*
ATTORNEY

Patented Jan. 7, 1941

2,227,476

UNITED STATES PATENT OFFICE 2,227,476

METHOD OF STRAIGHTENING WELDED STRUCTURES

Milo R. Williams and Allan L. Dunning, United States Navy

Application November 8, 1938, Serial No. 239,596

1 Claim. (Cl. 153—32)

(Granted under the act of March 3, 1883, as amended April 30, 1928; 370 O. G. 757)

This invention relates to a method of straightening welded structures, and it has a particular relation to the removal of warped or buckled areas in welded plate structures, such as decks and bulkheads.

The extensive use of welding in shipbuilding has introduced a new problem to the builder; that is the problem of straightening the welded structure after the completion of the welding operation. This is especially a problem on light plating, between ⅛" and ¼" in thickness. The reason for the buckling of the plating is the shrinkage caused by the welding. For example, if a weld is made around the periphery of a plate the edges are shrunk, leaving a buckle, or excess material, in the center of the plate. Where plate surfaces, such as bulkheads or platform decks are formed in separate panels by stiffeners, buckling occurs in the centers of the panels. In order to straighten these warped panels various methods have been employed. One common method has been to heat the buckle and then to hammer around and into the heated spot with a wood maul, thereby upsetting the excess material in the heated area. Upon cooling the heated metal contracts and pulls out some of the buckle. This operation requires from three to four men, one to heat the plate, one to back it up, one to hammer the plate, and one to cool the heated spot with air or water.

The principal object of the present invention is the provision of a method of and device for straightening warped and buckled areas in welded structures by heating a relatively small spot in the plate and simultaneously projecting a cooling medium around the heated spot so as to prevent the surrounding metal from expanding and forcing the heated metal to effect a molecular rearrangement and thickening within itself which, upon contracting with cooling, will draw flat the surrounding warped plate area without resorting to hammering or other mechanical manipulation.

Another object of the invention is the provision of a device by means of which the method may be quickly and easily effected by but a single operator.

With these and other objects in view, as well as other advantages that may be incident to the use of the improvements, the invention consists in the parts and combinations thereof hereinafter set forth and claimed, with the understanding that the several necessary elements constituting the same may be varied in proportion and arrangement without departing from the nature and scope of the invention, as defined in the appended claim.

In order to make the invention more clearly understood, there are shown in the accompanying drawing, means for carrying the invention into practical use, without limiting the improvements in their useful application to the particular construction, which, for the purpose of explanation, have been made the subject of illustration.

Figure 1:
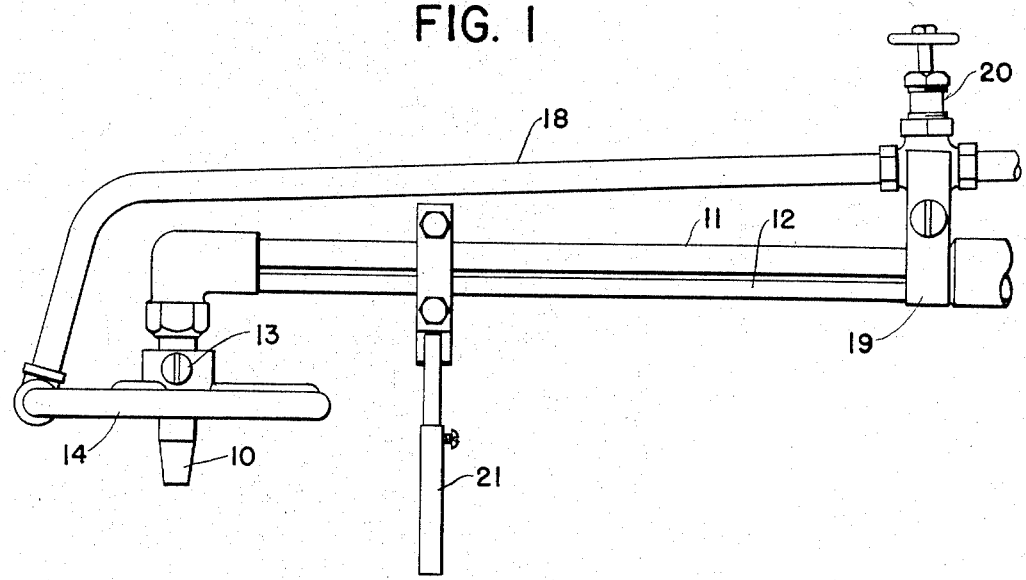
Fig. 1 is a side elevational view of a heating torch embodying the invention.
Figure 2:
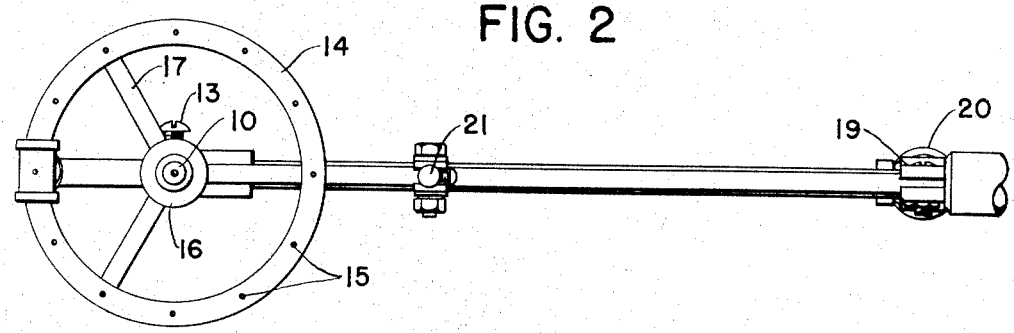
Fig. 2 is a bottom plan view of the structure shown in Fig. 1.

Referring to the drawing, a device constructed according to the invention is shown as comprising a torch having a burner tip 10 which is supplied with oxygen and acetylene gas through pipes 11 and 12 respectively. Secured to the burner tip 10 by a set screw 13 is an annular nozzle 14 provided with a plurality of relatively small perforations 15 and connected with a central hub 16 by spokes or arms 17. The nozzle 14 is supplied with a cooling medium, such as water or cold air, by a pipe 18 which extends above the pipes 11 and 12 and is connected thereto by a clamp 19. The flow of cooling medium to the nozzle 14 may be controlled by a valve 20. The burner tip is maintained at the proper distance from the plate being heated by an adjustable crutch or leg 21, secured to the pipes 11 and 12.

Figure 3:
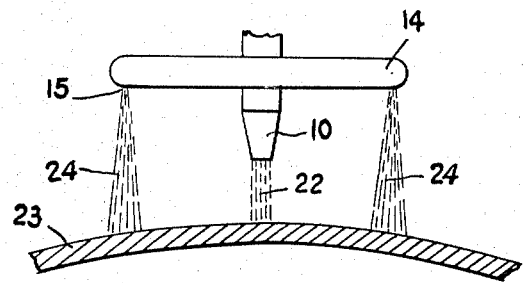
Fig. 3 is a diagrammatic sectional view showing the method of heating a central spot in a warped plate and simultaneously cooling the surrounding area to prevent the heat from being conducted away from the spot being heated.
Figure 4:
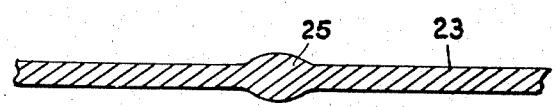
Fig. 4 is a similar view of the plate with the buckle removed and showing a thickened central portion.

By means of this construction, a flame 22 may be projected against the warped or buckled portion of a plate 23 so as to heat a relatively small spot and simultaneously a spray of air or water 24, or both, also projected against the plate in a circle surrounding the burner (Fig. 3). The heat is thus concentrated to a limited area and is prevented from spreading into the surrounding plate. This surrounding plate area is thus prevented from expanding with the result that the heated area is forced to expand within itself by thickening. When the heated area subsequently contracts with cooling it exerts a pull upon the surrounding plate such as will remove any warp or buckle existing therein resulting in a small thickened or upset central portion of 25 (Fig. 4).

The perforations 15 in the nozzle 14 are relatively small so as to deliver a very fine spray. The nozzle itself is preferably about four inches in diameter and the burner is held at the preferred distance from the work by the adjustable crutch 21. Variations in size and relative positions may be made as best suits the work. The device may be employed with equal effectiveness on both horizontal and vertical surfaces.

It will be understood that the above description and accompanying drawing comprehend only the general and preferred embodiment of the invention and that various changes in construction, proportion and arrangement of the parts may be made within the scope of the appended claim without sacrificing any of the advantages of the invention.

The invention described herein may be manufactured and used by or for the Government of the United States of America for governmental purposes without the payment of any royalties thereon or therefor.

Having thus set forth and disclosed the nature of this invention, what is claimed is:

The method of straightening welded metal surfaces having warps and buckles therein which comprises heating a spot in the buckle and simultaneously projecting a cooling medium in a fine spray in an area completely surrounding and adjacent to the heated spot to confine the heat to said spot and prevent the surrounding area from expanding thus causing the heated metal confined by said cooled area to expand within itself and become upset and thickened through molecular rearrangement, the surrounding cooled area subsequently absorbing radially the heat from the previously heated spot and causing the thickened metal in cooling to contract and exert tension upon the surrounding cooled area, such tension reducing the initial compressive strains contained in and causing the buckle, without the application of extraneous force.

MILO R. WILLIAMS.
ALLAN L. DUNNING.